US010126869B2

(12) United States Patent
Jo

(10) Patent No.: US 10,126,869 B2
(45) Date of Patent: Nov. 13, 2018

(54) ELECTRONIC DEVICE AND METHOD FOR PREVENTING TOUCH INPUT ERROR

(71) Applicant: Samsung Electronics Co., Ltd., Suwon-si, Gyeonggi-do (KR)

(72) Inventor: Yeon-Rae Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 14/254,158

(22) Filed: Apr. 16, 2014

(65) Prior Publication Data
US 2014/0313162 A1    Oct. 23, 2014

(30) Foreign Application Priority Data

Apr. 18, 2013  (KR) .................. 10-2013-0043146

(51) Int. Cl.
*G06F 3/045* (2006.01)
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0416* (2013.01); *G06F 2203/04105* (2013.01)

(58) Field of Classification Search
CPC ...... G06F 3/0412; G06F 3/0418; G06F 3/044; G06F 2203/04105; G06F 3/0416

USPC .......................................................... 345/174
See application file for complete search history.

(56) References Cited

U.S. PATENT DOCUMENTS

| 8,358,268 | B2* | 1/2013 | Evans ..................... G06F 3/041 345/156 |
| 2007/0152976 | A1 | 7/2007 | Townsend et al. |
| 2010/0097328 | A1 | 4/2010 | Simmons et al. |
| 2010/0283752 | A1* | 11/2010 | Maeda ........................ 345/173 |
| 2010/0302177 | A1 | 12/2010 | Kim et al. |
| 2012/0013558 | A1* | 1/2012 | Lin ....................... G06F 3/0416 345/173 |
| 2012/0188183 | A1 | 7/2012 | Heo et al. |
| 2013/0314370 | A1* | 11/2013 | Chang .................... G06F 3/044 345/174 |
| 2014/0098041 | A1* | 4/2014 | Ji ......................... G06F 3/0488 345/173 |

FOREIGN PATENT DOCUMENTS

| KR | 10-2007-0081178 A | 8/2007 |
| KR | 10-2010-0042761 A | 4/2010 |
| WO | 03-100716 A1 | 12/2003 |
| WO | 2006-135483 A2 | 12/2006 |

* cited by examiner

*Primary Examiner* — Gustavo Polo
(74) *Attorney, Agent, or Firm* — Jefferson IP Law, LLP

(57) ABSTRACT

A method of operating an electronic device is provided. The method includes determining whether a preset node range condition and a preset touch intensity condition are met, and skipping reading the coordinates of an area outside a preset node range if the preset node range condition and the preset touch intensity condition are not met.

12 Claims, 8 Drawing Sheets

ELECTRONIC DEVICE AND METHOD FOR PREVENTING TOUCH INPUT ERROR

CROSS-REFERENCE TO RELATED APPLICATION(S)

This application claims the benefit under 35 U.S.C. § 119(a) of a Korean patent application filed on Apr. 18, 2013 in the Korean Intellectual Property Office and assigned Serial No. 10-2013-0043146, the entire disclosure of which is hereby incorporated by reference.

TECHNICAL FIELD

The present disclosure relates to an electronic device and method for preventing touch input errors.

BACKGROUND

An electronic device with a single layer for a touch input has good transmittance and consumes less power, so it is widely used.

However, since the above-described single layer type electronic device senses a touch input according to whether a touch screen panel is bent, touch malfunction frequently occurs such as detection of a touch in an area not intended by a user.

Thus, there is a need for an algorithm that prevents touch malfunction due to the bending of a touch screen panel when a single layer type touch input is performed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a device and method for enhancing user convenience by preventing an input error resulting from a decrease in mutual capacitance that occurs outside a touched area according to whether a touch screen panel is bent.

Another aspect of the present disclosure is to provide a device and method for maximizing the advantages of a single layer by effectively preventing a touch input error by skipping reading the coordinates of an area outside a preset node range if a preset node range condition and a preset touch intensity condition are met.

In accordance with an aspect of the present disclosure, a method of operating an electronic device is provided. The method includes determining whether a preset node range condition and a preset touch intensity condition are met, and skipping reading the coordinates of an area outside a preset node range if the preset node range condition and the preset touch intensity condition are not met.

The method may further include receiving a touch input, and reading the coordinates of a touched area and sensing the touch input from an area corresponding to the read coordinates.

A touch screen of the electronic device may include a single layer.

The preset node range condition may be a condition that the coordinates of a touched area is within a preset node range.

The preset touch intensity condition may be a condition that a sensed touch intensity is lower than a preset intensity.

In accordance with another aspect of the present disclosure, an electronic device is provided. The electronic device includes a processor module configured to determine whether a preset node range condition and a preset touch intensity condition are met, and to skip reading the coordinates of an area outside a preset node range if the preset node range condition and the preset touch intensity condition are not met, and a memory configured to store data controlled by the processor module.

The electronic device may further include a touch screen configured to receive a touch input, and to read the coordinates of a touched area and senses the touch input from an area corresponding to the read coordinates.

The touch screen may include a single layer.

The preset node range condition may be a condition that the coordinates of a touched area is within a preset node range.

The preset touch intensity condition may be a condition that a sensed touch intensity is lower than a preset intensity.

In accordance with another aspect of the present disclosure, a method of operating an electronic device is provided. The method includes determining whether the coordinates of a touched area are outside a preset node range and a sensed touch intensity is equal to or higher than a preset intensity, and skipping reading the coordinates of an area outside the preset node range if it is determined that the coordinates of the touched area are outside the preset node range and the sensed touch intensity is equal to or higher than the preset intensity.

The method may further include receiving a touch input, and reading the coordinates of the touched area and sensing the touch input from an area corresponding to the read coordinates.

A touch screen of the electronic device may include a single layer.

In accordance with another aspect of the present disclosure, an electronic device is provided. The electronic device includes a processor module configured to determine whether the coordinates of a touched area are outside a preset node range and a sensed touch intensity is equal to or higher than a preset intensity, and to skip reading the coordinates of an area outside the preset node range if it is determined that the coordinates of the touched area are outside the preset node range and the sensed touch intensity is equal to or higher than the preset intensity, and a memory configured to store data controlled by the processor module.

The electronic device may further include a touch screen configured to receive a touch input, and to read the coordinates of the touched area and senses the touch input from an area corresponding to the read coordinates.

The touch screen may include a single layer.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
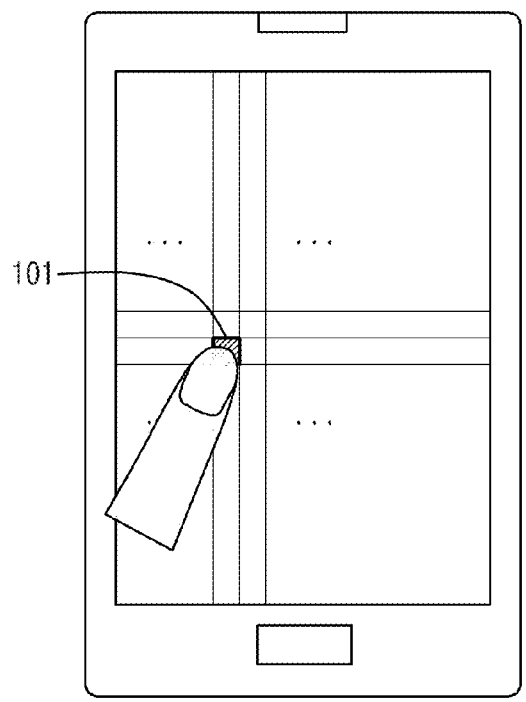
FIGS. 1A, 1B, and 1C are diagrams for explaining an electronic device to prevent a touch input error according to an embodiment of the present disclosure.
Figure 1B:
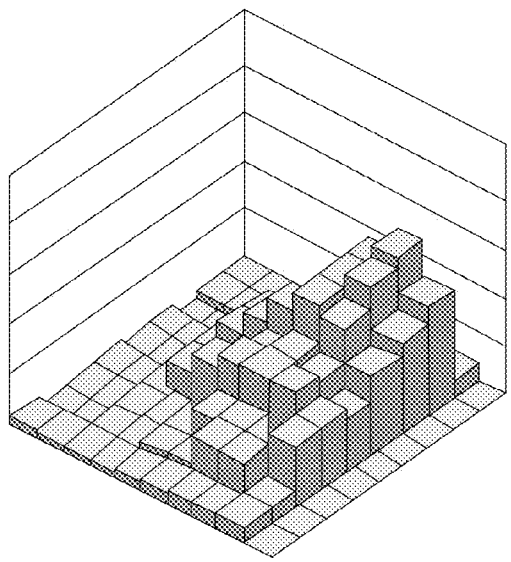
Figure 1C:
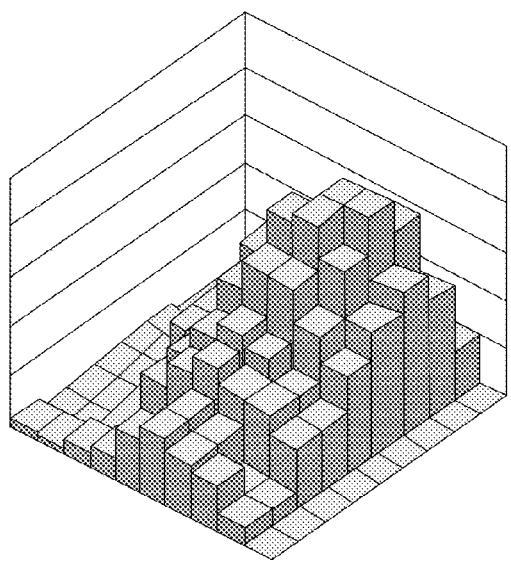

FIGS. 1A to 1C are diagrams for explaining an electronic device to prevent a touch input error according to an embodiment of the present disclosure. Herein, assume that a touch screen of the electronic device includes a plurality of areas, each of which has a preset size. Moreover, assume that each of the areas includes at least one node.

Referring to FIG. 1A, the electronic device may read the coordinates of a touched area 101 and sense a touch input from the area that corresponds to the read coordinates. More particularly, if the electronic device receives a certain touch input from a touch screen of the electronic device, the electronic device may read the coordinates of the touched area 101 in order to sense the touch input from the touched area and sense the touch input from the area corresponding to the read coordinates.

Although it is assumed that a touch screen panel has a single layer in the present disclosure, it may have two layers.

Subsequently, the electronic device may determine whether a preset node range condition and a preset touch intensity condition are satisfied. More particularly, the electronic device may determine whether the coordinates of a touched area are outside a preset node range and a sensed touch intensity is equal to or higher than a preset touch intensity, in order to determine whether the touch screen panel of the electronic device is bent more than a preset bending level. For example, assume that the preset node range is four nodes of a square and the present touch intensity is 10 if the electronic device receives a single touch input. In the above-described assumption, the electronic device may determine whether the read coordinates of a touched area are outside the four-node range and whether the touch intensity sensed by the electronic device is equal to or higher than 10.

If it is determined that the coordinates of the touched area on the electronic device are outside a preset node range and that the sensed touch intensity is equal to or higher than a preset intensity, the electronic device may not read the coordinates of an area that is outside the preset node range. More particularly, if it is determined that the electronic device does not satisfy the above-described preset node range condition nor the above-described touch intensity condition, the electronic device may not read the coordinates of an area that is outside the preset node range.

In the above-described assumption, if it is determined that the read coordinates of a touched area are outside a four-node range that is a preset node range and the touch intensity sensed by the electronic device is equal to or higher than 10 that is a preset intensity, the electronic device may not read the coordinates of an area outside the preset node range.

That is, referring to FIGS. 1B and 1C that schematically depict the intensity of a touch, assume that the electronic device satisfies a condition that the coordinates of a touched area is in a preset node range.

If it is determined that the intensity of the electronic device is lower than a preset intensity as shown in FIG. 1B, the electronic device may read the coordinates of the touched area and sense a touch input from the touched area. However, if it is determined that the intensity of a touch sensed by the electronic device is lower than a preset intensity as shown in FIG. 1C, the electronic device may not read the coordinates of an area outside a preset node range in order to prevent a touch input error due to the bending of a touch screen panel.

In the case of a typical electronic device, since its touch screen panel is bent more than a preset bending level and the gap between a liquid crystal display and the touch screen panel becomes narrower, the typical electronic device suffers from an input error by which the typical electronic device senses a substantially intended touch area in addition to a substantially unintended touch area.

However, in order to determine whether a touch screen panel is bent more than a preset bending level by a touch input, the electronic device according to the present disclosure has an advantage in that it is possible to effectively prevent the touch input error of the electronic device by skipping reading the coordinates of an area outside a preset node range according to a preset node range condition and a preset touch intensity condition.

Figure 2A:
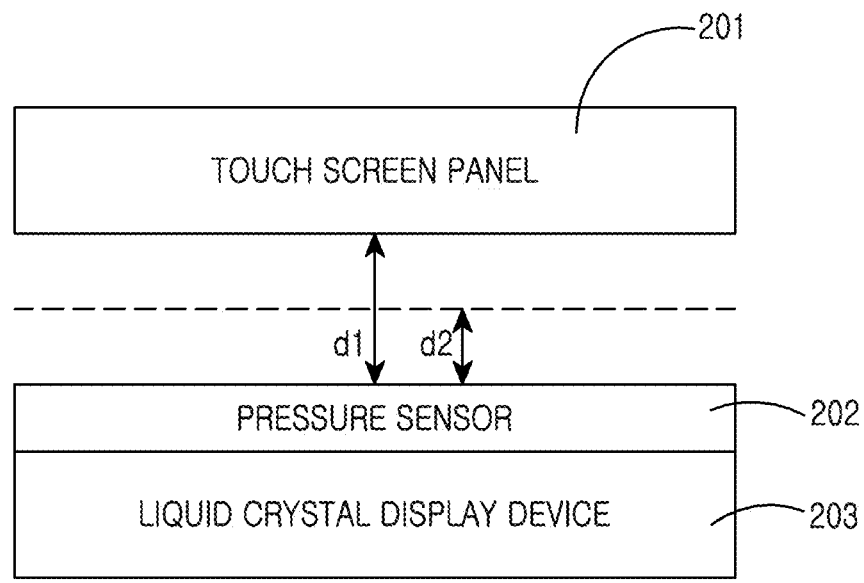
FIGS. 2A and 2B show an embodiment to sense a touch input error by using a pressure sensor in an electronic device according to an embodiment of the present disclosure.
Figure 2B:
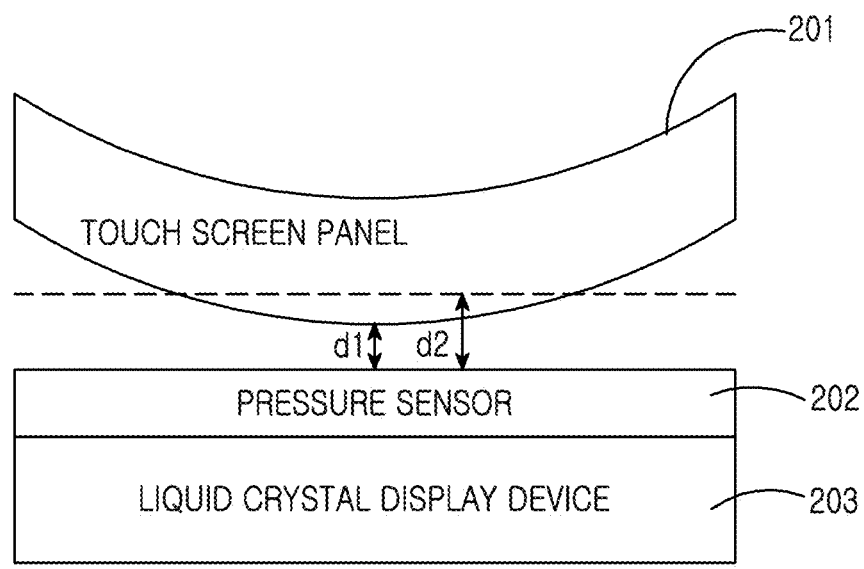

FIGS. 2A and 2B show an embodiment to sense a touch input error by using a pressure sensor in an electronic device according to an embodiment of the present disclosure. As described in detail with reference to FIGS. 1A to 1C, the electronic device according to the present disclosure may prevent a touch input error when both the preset node range condition and the preset touch intensity are satisfied. However, according to the present embodiment, the electronic device may prevent a touch input error by using a pressure sensor.

Referring to FIGS. 2A and 2B, assume that the electronic device sequentially includes a touch screen panel 201, a pressure sensor 202, and a liquid crystal display device 203. Moreover, assume that the touch screen panel 201 and the pressure sensor 202 are at a first distance d1 and need to be in a second distance d2 to allow the pressure sensor 202 to sense a touch input from the touch screen panel 201.

In the above-described assumption, as shown in FIG. 2A, since the touch screen panel 201 of the electronic device does not receive a touch input, the first distance d1 between the touch screen panel 201 and the pressure sensor 202 is outside the second distance d2 that is set to allow the pressure sensor 202 to sense a touch input. Thus, since the pressure sensor 202 of the electronic device does not sense a pressure equal to or higher than a preset pressure, the electronic device may skip reading coordinate values.

However, as shown in FIG. 2B, if the touch screen panel 201 of the electronic device receives a touch input, the first distance d1 between the touch screen panel 201 and the pressure 202 is within the second distance d2 for allowing the pressure sensor 202 to sense a touch input. Thus, since the pressure sensor 202 of the electronic device may sense a pressure equal to or higher than a preset pressure, the electronic device may read the coordinate values of a touched area.

Figure 3A:
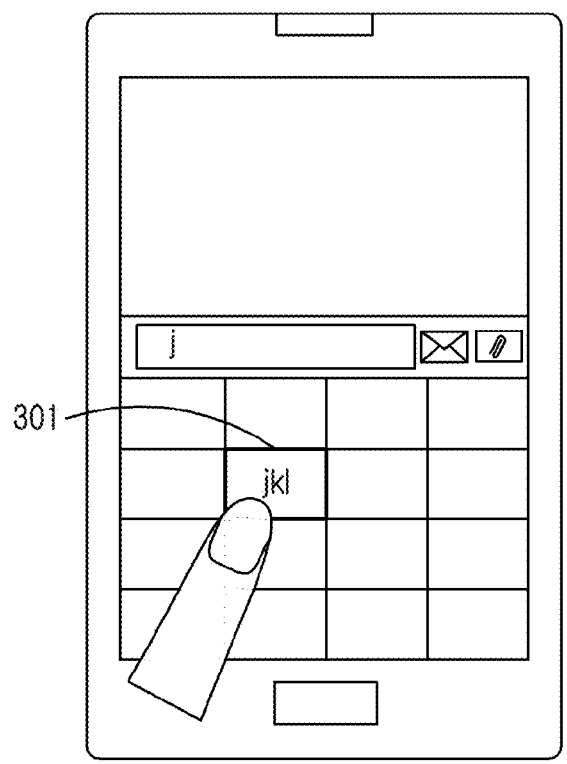
FIGS. 3A, 3B, and 3C show an embodiment to prevent a touch input error in an electronic device according to an embodiment of the present disclosure.
Figure 3B:
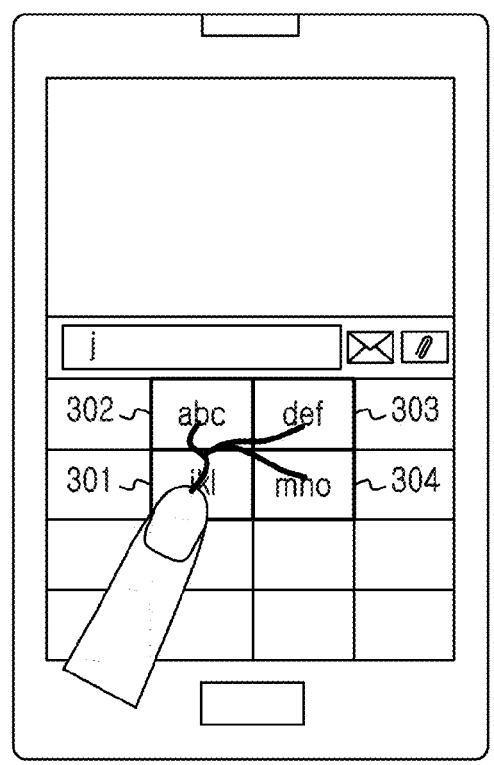
Figure 3C:
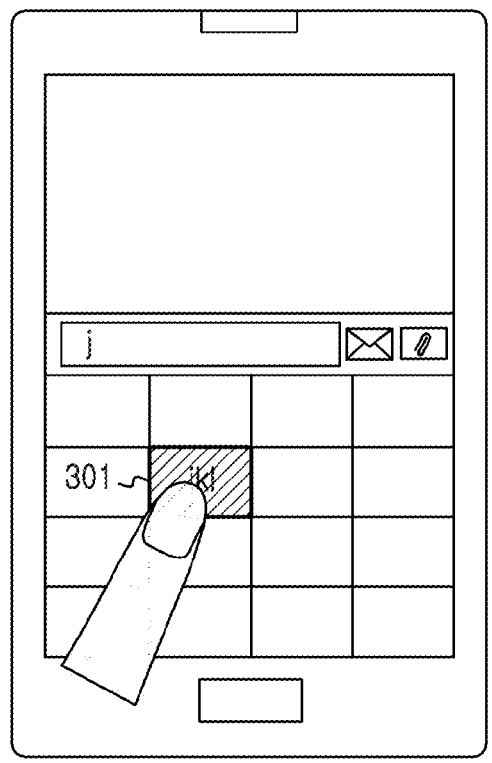

FIGS. 3A to 3C show an embodiment to prevent a touch input error in an electronic device according to an embodiment of the present disclosure. Firstly, assume that the electronic device receives a command to display a key pad window in order to send a text message and displays the key pad window on the touch screen of the electronic device.

Referring to FIG. 3A, the electronic device may sense a touch input from a specific key 301 of the key pad window displayed on the touch screen of the electronic device. More particularly, if the electronic device receives a certain touch input through the touch screen of the electronic device, it may read the coordinates of a touched area in order to sense a touch input from the touched area and may sense the touch input from an area corresponding to the read coordinates. For example, as shown in FIG. 3A, the electronic device may read the coordinates of the touched area, sense a touch input from an area corresponding to the read coordinates and input the value "j".

Subsequently, the electronic device may determine whether a preset node range condition and a preset touch intensity condition are satisfied. More particularly, in order to determine whether a touch screen panel is bent more than a preset bending level, the electronic device may determine whether the coordinates of a touched area are outside the preset node range and a sensed touch intensity is equal to or higher than the preset intensity.

If it is determined that the coordinates of a touched area are outside the preset node range and a sensed touch intensity is equal to or higher than the preset intensity as shown in FIG. 3B, the electronic device may skip reading the coordinates of an area that is outside the preset node range. More particularly, if it is determined that both the above-described preset node range condition and the above-described preset intensity condition are not satisfied, the electronic device may skip reading the coordinates of an area that is outside the preset node range.

For example, as shown in FIGS. 3B and 3C, assume that as a result that the electronic device recognizes the coordinates of a touched area, even neighboring keys 302 to 304 outside a specific-key area in addition to a specific key 301 for inputting the value "j", "k" or "1" that belongs to a preset node range are detected. Moreover, assume that a touch intensity equal to or higher than a preset touch intensity has been sensed at the electronic device.

In the above-described assumption, the electronic device may input only the specific key 301, not the neighboring keys 302 to 304 outside the specific-key area. Thus, the electronic device according to the present disclosure may prevent a touch input from the neighboring keys 302 to 304 that may input the values "a/b/c", "d/e/f" and "m/n/o" outside the specific key 301 that is in a preset node range. That is, the electronic device according to the present disclosure may prevent an input error.

Figure 4A:
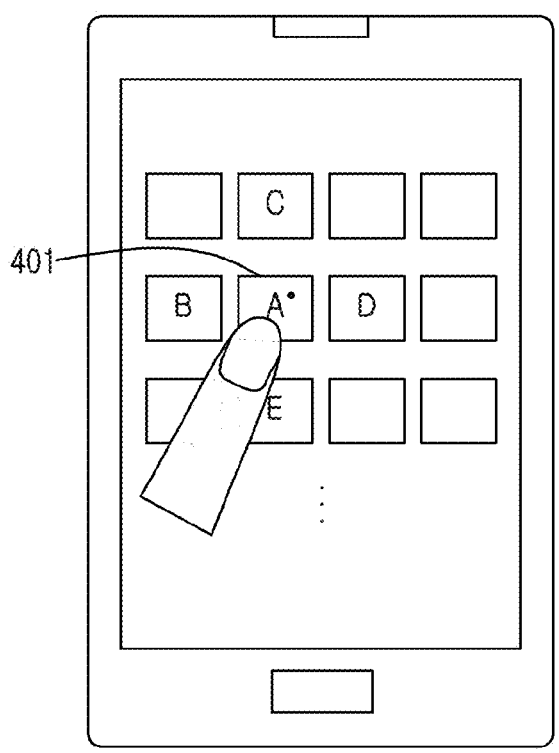
FIGS. 4A, 4B, and 4C show another embodiment to prevent a touch input error in an electronic device according to an embodiment of the present disclosure.
Figure 4B:
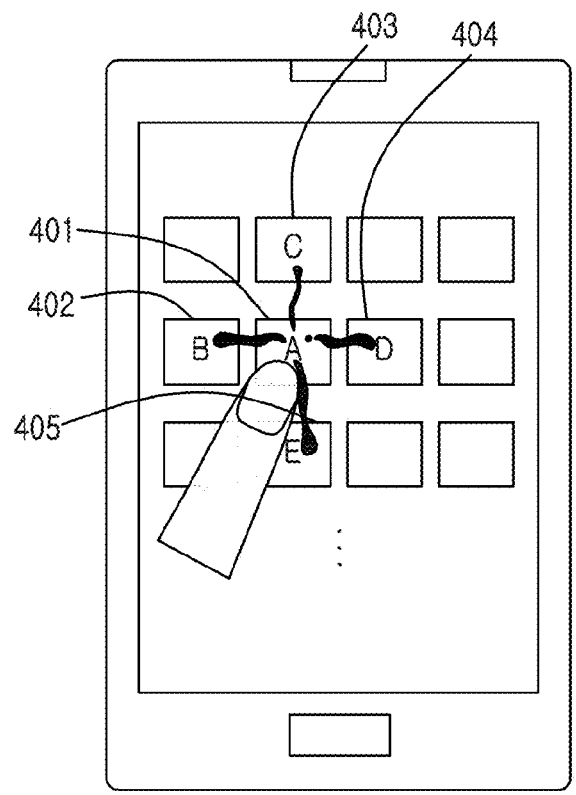
Figure 4C:
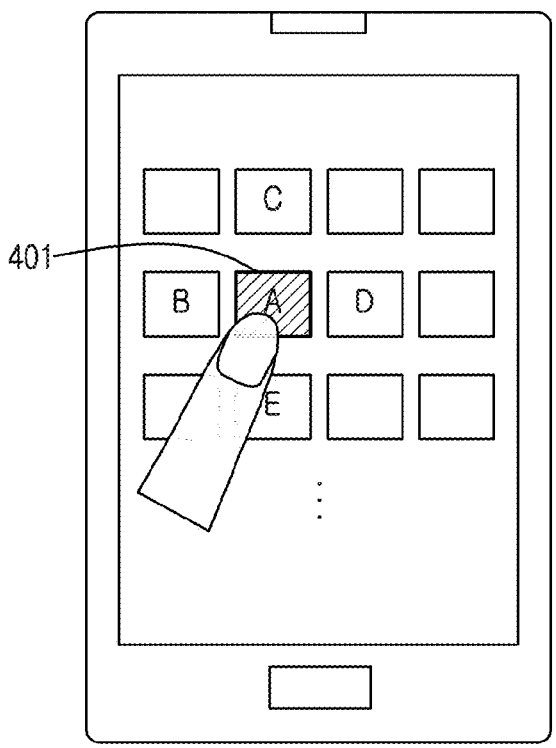

FIGS. 4A to 4C show another embodiment to prevent a touch input error in an electronic device according to an embodiment of the present disclosure. Firstly, assume that the electronic device receives a command to display applications installed in the electronic device and display a plurality of applications on the touch screen of the electronic device.

Referring to FIG. 4A, the electronic device may sense a touch input from an "A application" 401 of the plurality of applications displayed on the touch screen of the electronic device. More particularly, if the electronic device receives a certain touch input from the touch screen of the electronic device, the electronic device may read the coordinates of a touched area in order to sense a touch input from the touched area and may sense the touch input from an area corresponding to the read coordinates. For example, as shown in FIG. 4A, the electronic device may read the coordinates of a touched area, sense a touch input from an area corresponding to the read coordinates and sense that there is a touch input for an "A application" 401.

Subsequently, the electronic device may determine whether a preset node range condition and a preset touch intensity condition are satisfied. More particularly, in order to determine whether a touch screen panel is bent more than a preset bending level, the electronic device may determine whether the coordinates of a touched area is outside a preset node range and a sensed touch intensity is equal to or higher than a preset intensity.

If the electronic device determines that the coordinates of a touched area are outside a preset node range and a sensed touch intensity is equal to or higher than a preset intensity as shown in FIG. 4B, the electronic device may skip reading the coordinates of an area that is outside a preset node range. More particularly, if the electronic device determines that both the above-described node range condition and the above-described touch intensity condition are not satisfied, it may skip reading the coordinates of an area that is outside a preset node range.

For example, as shown in FIGS. 4B and 4C, assume that as a result that the electronic device recognizes the coordinates of a touched area, even neighboring applications 402 to 405 outside an "A application" 401 area in addition to the "A application" 401 area for executing an "A application" 401 that belongs to a preset node range are detected. Moreover, assume that a touch intensity equal to or higher than a preset touch intensity has been sensed at the electronic device.

In the above-described assumption, the electronic device may input only the "A application" 401, not the neighboring applications 402 to 405 outside the "A application" 401 area. Thus, the electronic device according to the present disclosure may prevent a touch input from the neighboring applications 402 to 405 that may execute a "B application", a "C application", a "D application", and an "E application". That is, the electronic device according to the present disclosure may prevent an input error.

Figure 5:
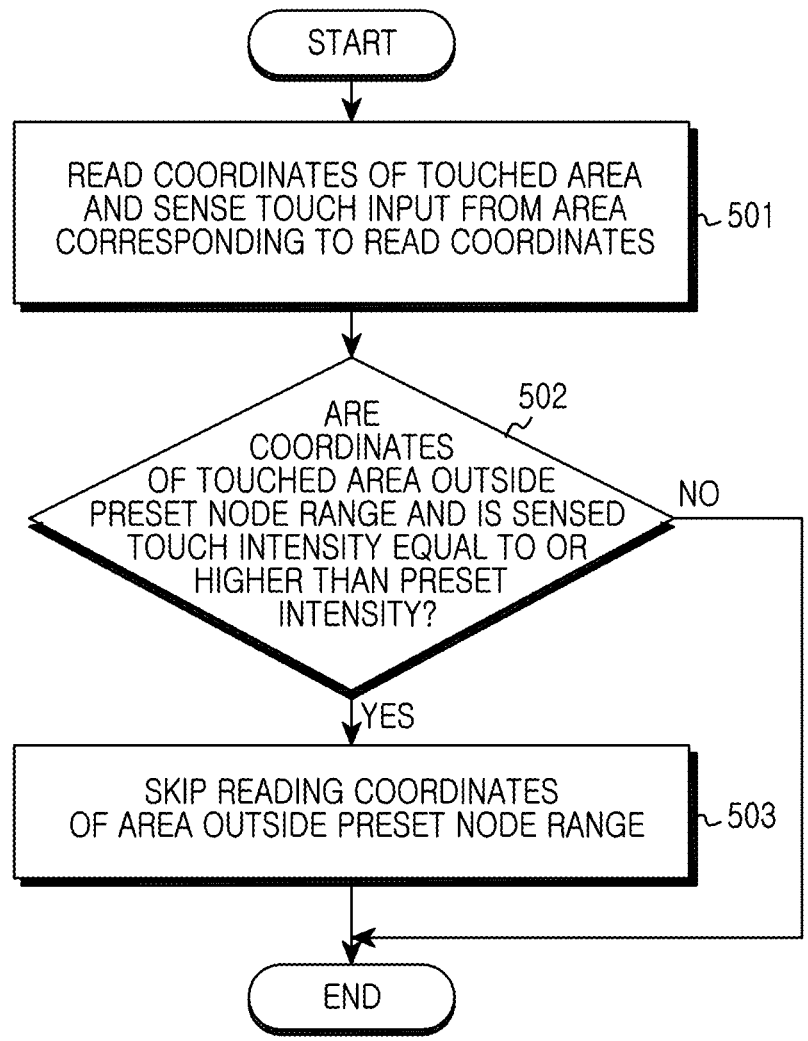
FIG. 5 is a flowchart of an operation order of an electronic device to prevent a touch input error according to an embodiment of the present disclosure.

FIG. 5 is a flowchart of an operation order of an electronic device to prevent a touch input error according to an embodiment of the present disclosure.

Referring to FIG. 5, the electronic device may read the coordinates of a touched area and sense a touch input from an area corresponding to the read coordinates in operation 501. More particularly, if the electronic device receives a certain touch input from a touch screen, the electronic device may read the coordinates of the touched area in order to sense the touch input from the touched area and sense the touch input from the area corresponding to the read coordinates.

Subsequently, the electronic device may determine whether a preset node range condition and a preset touch intensity condition are satisfied, in operation 502. More particularly, the electronic device may determine whether the coordinates of a touched area are outside a preset node range and a sensed touch intensity is equal to or higher than a preset touch intensity, in order to determine whether the touch screen panel of the electronic device is bent more than a preset bending level. For example, assume that the preset node range is four square nodes and the present touch intensity is 10 if the electronic device receives a single touch input. In the above-described assumption, the electronic device may determine whether the read coordinates of a touched area are outside the four-node range and whether the touch intensity sensed by the electronic device is equal to or higher than 10.

If it is determined that the coordinates of the touched area on the electronic device are outside a preset node range and that the sensed touch intensity is equal to or higher than a preset intensity, the electronic device may skip reading the coordinates of an area that is outside the preset node range in operation 503. Here, a requirement that the sensed touch is maintained in equal to or higher than a preset threshold time may be used as the requirement for the sensed touch intensity. That is, the preset touch intensity condition may be a condition that a sensed touch is touched for longer time than a preset threshold time. More particularly, if it is determined that the electronic device does not satisfy the above-described preset node range condition nor the above-described touch intensity condition, the electronic device may skip reading the coordinates of an area that is outside the preset node range.

In the determination process 502, if the electronic device determines that a touched area is not outside a preset node range or a sensed touch intensity is lower than a preset touch intensity, the electronic device reads the coordinates of an initially touched area and senses a touch input from an area corresponding to the read coordinates, so it is possible to terminate this algorithm.

Figure 6A:
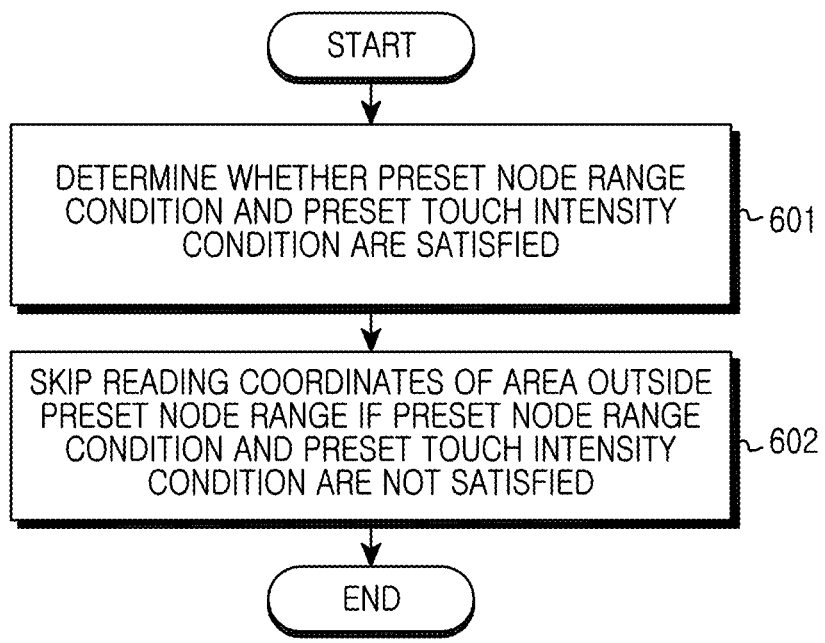
FIG. 6A is a flowchart of an operation method of an electronic device to prevent a touch input error according to an embodiment of the present disclosure

FIG. 6A is a flowchart of an operation method of an electronic device to prevent a touch input error according to an embodiment of the present disclosure.

Referring to FIG. 6A, the electronic device may determine whether a preset node range condition and a preset touch intensity condition are satisfied, in operation 601. More particularly, the electronic device may determine whether the coordinates of a touched area is outside the preset node range and a sensed touch intensity is equal to or higher than the preset intensity.

Subsequently, the electronic device may skip reading the coordinates of an area that is outside the preset node range, if the preset node range condition and the preset touch intensity condition are not satisfied, in operation 602. Here, a requirement that the sensed touch is maintained in equal to or higher than a preset threshold time may be used as the requirement for the sensed touch intensity. That is, the preset touch intensity condition may be a condition that a sensed touch is touched for longer time than a preset threshold time. More particularly, the electronic device determines that both the above-described preset node range condition and the above-described preset touch intensity condition are not satisfied, the electronic device may skip reading the coordinates of an area that is outside the preset node range.

Figure 6B:
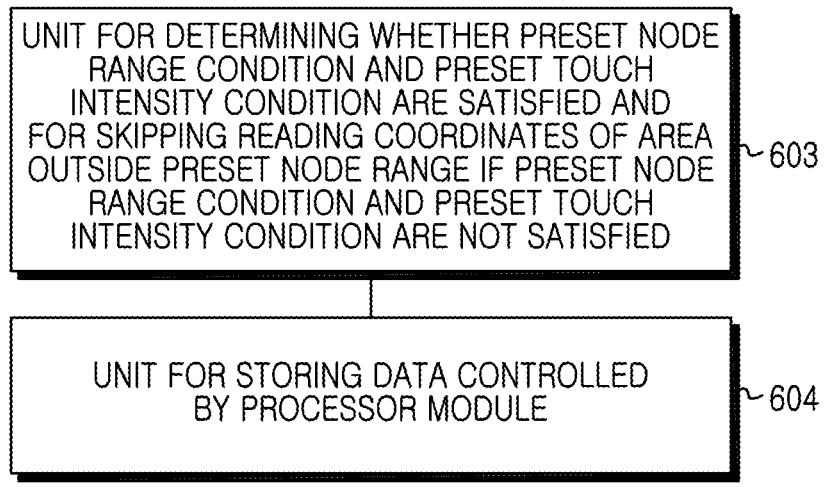
FIG. 6B is a block diagram of an electronic device to prevent a touch input error according to an embodiment of the present disclosure.

FIG. 6B is a block diagram of an electronic device to prevent a touch input error according to an embodiment of the present disclosure.

Referring to FIG. 6B, a unit 603 (e.g., a processor module) of the electronic device may determine whether the preset node range condition and the preset touch intensity condition are satisfied, and read the coordinates of an area outside the preset node range, if the node range condition and the preset touch intensity condition are not satisfied. More particularly, the unit 603 of the electronic device may determine whether the coordinates of a touched area is outside the preset node range and a sensed touch intensity is equal to or greater than the preset intensity, and may skip reading the coordinates of an area outside the preset node range, if the preset node range condition and the preset touch intensity condition are not satisfied.

A unit 604 (e.g., a memory) of the electronic device may subsequently store data that is controlled in the processor module of the electronic device.

Figure 7:
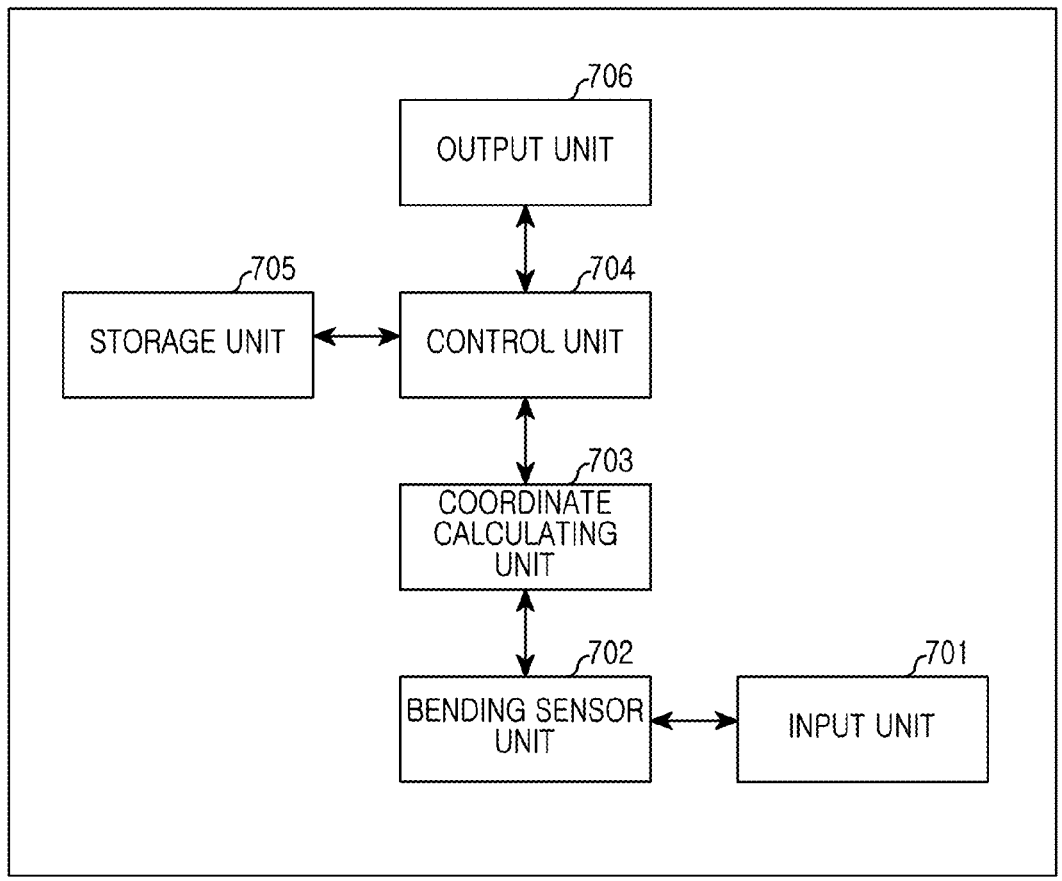
FIG. 7 is a schematic block diagram of an electronic device according to an embodiment of the present disclosure.

FIG. 7 is a schematic block diagram of an electronic device according to an embodiment of the present disclosure.

Referring to FIG. 7, the electronic device according to the present disclosure may include an input unit 701, a bending sensor unit 702, a coordinate calculating unit 703, a control unit 704, a storage unit 705, and an output unit 706.

The input unit 701 may recognize a touch input from a touch screen of the electronic device.

The bending sensor unit 702 may determine whether a bending level of a touch screen panel is equal to or higher than a preset bending level.

If receiving a signal that the bending level of the touch screen panel is equal to or higher than the preset bending level, the coordinate calculating unit 703 may calculate the coordinates of a touched area and then transmit the calculated coordinates of the touched area to the control unit 704.

The control unit 704 may control the overall operations of the electronic device. For example, the control unit 704 may receive the calculated coordinates of the touched area and avoid a touch input error. More particularly, the control unit 704 may receive the calculated coordinates of the touched area from the coordinate calculating unit 703 and skip reading the coordinates of an area outside a preset node range.

The storage unit 705 may include a program storage unit that stores programs for controlling the operation of the electronic device, and a data storage unit that stores data generated during the execution of the programs.

In the above-described block diagram, the control unit 704 may perform the overall functions of the electronic device. For convenience of description, the functions are separately shown in FIG. 7. Thus, when a product is actually produced, it may be configured so that all or only some functions of the electronic device are processed by the control unit 704.

Figure 8:
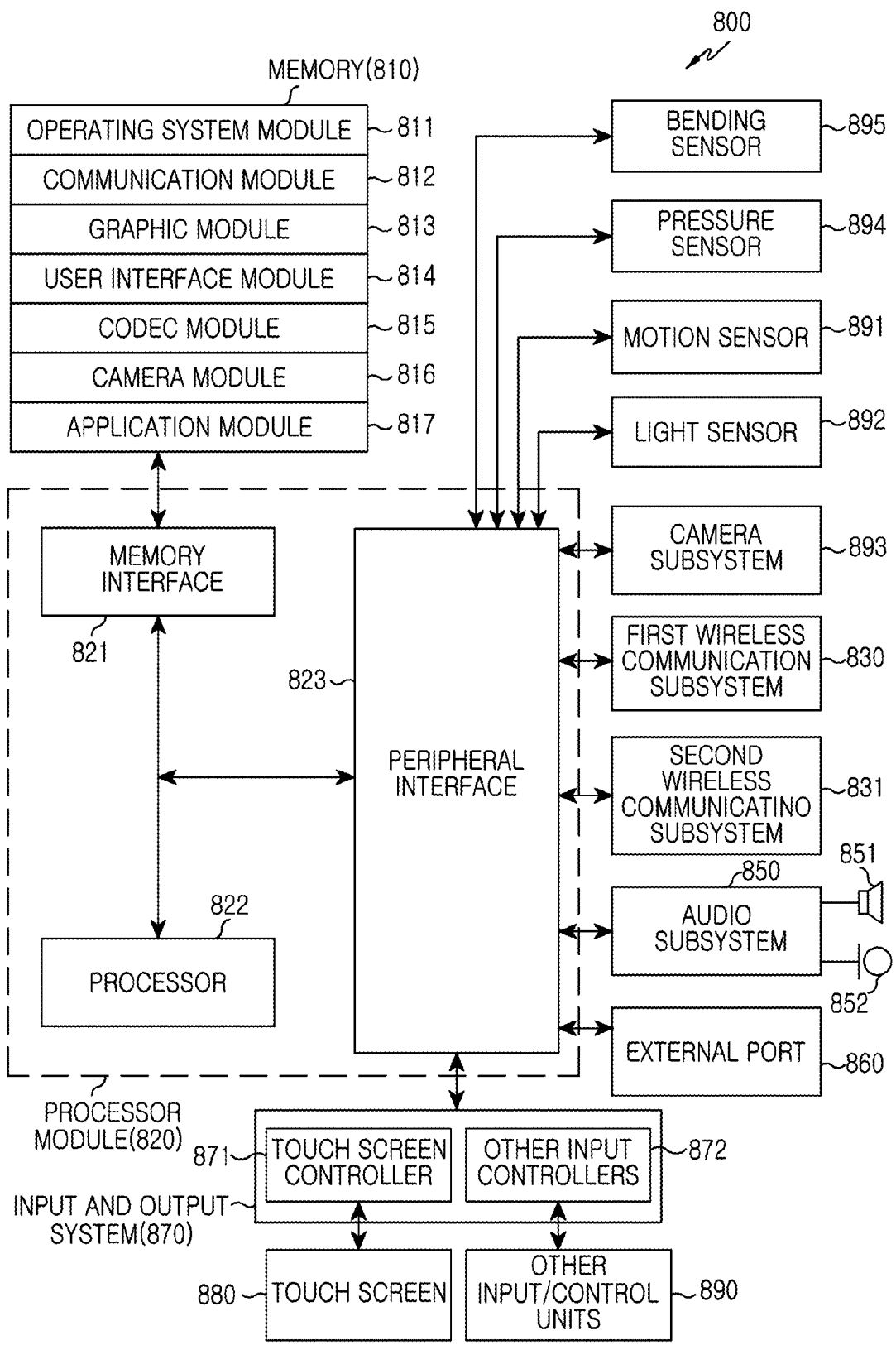
FIG. 8 is a block diagram of an electronic device according to an embodiment of the present disclosure.

FIG. 8 is a block diagram of an electronic device according to an embodiment of the present disclosure. Such an electronic device 800 may be a portable electronic device such as a portable terminal, a mobile phone, a mobile pad, a media player, a tablet computer, handheld computer, a Personal Digital Assistant (PDA), etc. Moreover, the electronic device may be any portable electronic device that includes combinations of two or more of these devices.

Referring to FIG. 8, the electronic device 800 includes a memory 810, a processor module 820, a first wireless communication subsystem 830, a second wireless communication subsystem 831, an external port 860, an audio subsystem 850, a speaker 851, a microphone 852, an Input and Output (IO) system 870, a touch screen 880, and other input or control units 890. Each of the memory 810 and the external port 860 may be in plural.

The processor module 820 may include a memory interface 821, one or more processors 822 and a peripheral interface 823. In some cases, the processor module 820 itself may be referred to as a processor. In the embodiment, the processor module 820 may determine whether a preset node range condition and a preset touch intensity condition are satisfied, and skip reading the coordinates of an area outside the preset node range if the preset node range condition and the preset touch intensity condition are not satisfied.

The processor 822 executes several software programs to perform several functions for the electronic device 800 and processing and control for voice and data communications. Moreover, in addition to such typical functions, the processor 822 executes specific software modules (a command set) stored in the memory 810 to perform several specific functions corresponding to the modules. That is, the processor 822 performs a method according to an embodiment of the present disclosure in conjunction with software modules stored in the memory 810.

The processor 822 may include one or more data processors, an image processor, and a CODEC. The data processor, the image processor, and the CODEC may be separately configured. Alternatively, the processor may include several processors that perform different functions. The peripheral interface 823 connects the input and output subsystem 870 of the electronic device 800 and several peripheral devices to the processor 822 and the memory (through a memory interface).

The various components of the electronic device 800 may be coupled by one or more communication buses (without any reference numeral) or stream lines (without any reference numeral).

The external port 860 is used for connecting a portable electronic device (not shown) to another electronic device directly or indirectly through a network (for example, an internet, an intranet, a wireless Local Area Network (LAN), etc.) The external port 860 indicates, for example, a Universal Serial Bus (USB) port or a FIREWIRE port but is not limited thereto.

A motion sensor 891 and a first light sensor 892 may be coupled to the peripheral interface 823 to enable several functions. For example, the motion sensor 891 and the light sensor 892 may be coupled to the peripheral interface 823 to sense the motion of the electronic device and light from the outside respectively. In addition, other sensors such as a location measuring system, a temperature sensor, or a bio-sensor may be connected to the peripheral interface 823 to perform related functions. A bending sensor 805 of the present disclosure may determine whether a touch screen panel is bent more than a preset bending level.

A pressure sensor 894 may detect the pressure of liquid or a gas and convert the detected pressure into an electrical signal that is easy to use for measurement or control.

A camera subsystem 893 may perform camera functions such as picture and video clip recording.

The light sensor 892 may use a Charged Coupled Device (CCD) or a Complementary Metal-Oxide Semiconductor (CMOS) device.

A communication function is performed through one or more wireless communication subsystems 830 and 831. The wireless communication subsystems 830 and 831 may include a radio frequency receiver and transceiver and/or an optical (for example, infrared) receiver and transceiver.

The first communication subsystem 830 and the second communication subsystem 831 may be classified according to a communication network with which the electronic device 800 communicates. For example, the communication network may include a communication subsystem that is designed to operate through Global System for Mobile Communication (GSM), Enhanced Data GSM Environment (EDGE), Code Division Multiple Access (CDMA), W-Code Division Multiple Access (W-CDMA), Long Term Evolution (LTE), Orthogonal Frequency Division Multiple Access (OFDMA), Wireless Fidelity (Wi-Fi), WiMax and/or Bluetooth networks, but is not limited thereto. The first wireless communication subsystem 830 and the second wireless communication subsystem 831 may be combined to be configured as one wireless communication subsystem.

The audio subsystem 850 may be coupled to the speaker 851 and the microphone 850 to be responsible for the input and output of an audio stream such as voice recognition, voice copy, digital recording and phone functions. That is, the audio subsystem 850 communicates with a user through the speaker 851 and the microphone 852. The audio subsystem 850 receives a data stream through the peripheral interface 823 of the processor unit 820 and converts the received data stream into an electrical signal. The converted electrical signal is delivered to the speaker 851. The speaker 851 converts and outputs the electrical signal into a sound wave that a human being may hear. The microphone 852 converts the sound wave delivered from a human being or other sound sources into an electrical signal. The audio subsystem 850 receives the converted electrical signal from the microphone 852. The audio subsystem 850 converts the received electrical signal into an audio data stream and transmits the converted audio data stream to the peripheral interface 823. The audio subsystem 850 may include a detachable ear phone, a head phone or a head set.

The IO subsystem 870 may include a touch screen controller 871 and/or other input controllers 872. The touch screen controller 871 may be coupled to the touch screen 880. The touch screen 880 and the touch screen controller 871 may detect contact and a motion or a contact or motion stop by using any multi-touch sensing technology including a proximity sensor array or other elements in addition to capacitive, resistive, infrared and surface acoustic wave technologies to determine one or more contact points with the touch screen 880. The other input controllers 872 may be coupled to the other input/control units 890. The other input/control units 890 may be a pointer unit such as one or more buttons, a rocker switch, a thumb wheel, a dial, a stick, and/or a stylus.

The touch screen 880 provides an input/output interface between the electronic device 800 and a user. That is, the touch screen 880 delivers a user's touch input to the electronic device 800. Moreover, the touch screen 880 is a medium through which an output from the electronic device 800 is shown to the user. That is, the touch screen 880 shows a visual output to the user. Such a visual output is represented as texts, graphics, videos, and combinations thereof Several displays may be used as the touch screen 880. For example, a Liquid Crystal Display (LCD), a Light Emitting Diode (LED), a Light emitting Polymer Display (LPD), Organic LED (OLED), Active Matrix Organic LED (AMO-LED) or Flexible LED (FLED) may be used but the present disclosure is not limited thereto. In the present embodiment, the touch screen 880 may receive a touch input, read the coordinates of a touched area and sense the touch input from the area corresponding to the read coordinates.

The memory 810 may be coupled to the memory interface 821. The memory 810 may include one or more high-speed random access memories such magnetic disc storage units and/or one or more non-volatile memories, one or more optical storage units and/or flash memories (for example, a NAND or NOR memory).

The memory stores software. Software components includes an Operating System (OS) module 811, a communication module 812, a graphic module 813, a user interface module 814, an CODEC module 815, a camera module 816, one or more application modules 817, etc. Moreover, since a module that is a software component may be referred to as a set of instructions, the module is also represented as an instruction set. The module is also referred to as a program. The OS module 811 (for example, internal OS such as WINDOWS, LINUX, Darwin, RTXC, UNIX, OS X, or VxWorks) includes several software components that control general system operations. The control of the general system operations means, for example, memory management and control, storage hardware (device) control and management, and power control and management. Such OS software also performs a function of making communication between a lot of hardware (devices) and software components (modules) smooth.

The communication module 812 may enable communication with another electronic device such as a computer, a server and/or a portable terminal through the wireless communication subsystems 830 and 831 or the external port 860.

The graphic module 813 includes several software components for providing and displaying graphics to and on the touch screen 880. The term graphics is used as a meaning to include a text, a web page, an icon, a digital image, video, animation, etc.

The user interface module 814 includes several software components related to a user interface. That is, it includes details on how the state of the user interface is changed or under which condition the state change of the user interface is made.

The CODEC module 815 may include software components related to the encoding and decoding of a video file. The CODEC module may include a video stream module such as a Moving Picture Experts Group (MPEG) module and/or an H204 module. Moreover, the CODEC module may include a CODEC module for several audio files such as AAA, AMR, WMA, etc. Moreover, the CODEC module 815 includes a set of instructions corresponding to a method of practicing the present disclosure.

The camera module 816 includes camera related software components that enable camera related processes and functions.

The application module 817 includes a browser application, an email application, an instant message application, a word processing application, a keyboard emulation application, an address book application, a touch list application, a widget application, a Digital Right Management (DRM) application, a voice recognition application, a voice copy application, a position determining application, and a location based service application, etc.

Moreover, the above-described various functions of the electronic device 800 according to the present disclosure may be executed by hardware and/or software and/or a combination thereof, the hardware including one or more stream processing and/or Application Specific Integrated Circuit (ASIC).

It will be appreciated that embodiments of the present invention according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present invention. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Obviously, many various variations may be made within the scope of the claims. In other words, there may be many other various embodiments that may practice the present disclosure without departing from the scope of the following claims.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:

displaying an object on a touch screen comprising an array of sensing nodes;

when the touch screen receives a touch input on at least one first node corresponding to the displayed object, and at least one second node outside of the at least one first node;

identifying touch intensity of the at least one second node by using a pressure sensor included in the electronic device;

if the touch intensity of the at least one second node is equal to or higher than a preset intensity, reading coordinates of the at least one first node and the at least one second node of the touch input; and if the touch intensity of the at least one second node is lower than the preset intensity, reading coordinates of the first nodes of the touch input excluding the at least one second node.

2. The method of claim 1, wherein the touch screen of the electronic device comprises a single layer.

3. The method of claim 1, further comprising identifying the at least one second node outside nodes of a predetermined size among first nodes where the touch input is received.

4. The method of claim 1, further comprising,
if receiving time of the at least one second node is equal to or longer than a preset threshold time, reading coordinates of the first nodes of the touch input, and
if the receiving time of the at least one first node is shorter than the preset threshold time, reading coordinates of the first nodes of the touch input excluding the at least one first node.

5. An electronic device comprising:
a memory storing instructions;
a touch screen comprising an array of sensing nodes;
a pressure sensor; and
at least one processor configured to execute the stored instructions to:
display an object on the touch screen; and
when the touch screen receives a touch input on at least one first node corresponding to the displayed object, and at least one second node outside of the at least one first node:
identify touch intensity of the at least one first node and the at least one second node by using the pressure sensor;

if the touch intensity of the at least one second node is equal to or higher than a preset intensity, read coordinates of the first nodes and the at least one second node of the touch input; and if the touch intensity of the at least one second node is lower than the preset intensity, read coordinates of the first nodes of the touch input excluding the at least one second node.

6. The electronic device of claim 5, wherein the touch screen comprises a single layer.

7. The electronic device of claim 5, wherein the at least one processor is further configured to execute the stored instructions to identify the at least one second node outside nodes of a predetermined size among first nodes where the touch input is.

8. The electronic device of claim 5, wherein the at least one processor is further configured to execute the stored instructions to:
if receiving time of the at least one second node is equal to or longer than a preset threshold time, read coordinates of the first nodes of the touch input, and
if the receiving time of the at least one first node is shorter than the preset threshold time, read coordinates of the first nodes of the touch input excluding the at least one first node.

9. The method of claim 1, wherein the touch intensity is determined by using a pressure sensor included in the electronic device.

10. The method of claim 1, wherein the identifying the touch intensity of the at least one second node is performed when it is determined that a bending level of the touch screen is equal to or higher than a preset bending level by using a bending sensor.

11. The electronic device of claim 5, further comprising a pressure sensor overlapped to the touch screen,
wherein the touch intensity is determined by using the pressure sensor.

12. The electronic device of claim 5, further comprising a bending sensor,
wherein the at least one processor is configured to execute the stored instructions to identify the touch intensity of the at least one second node when it is determined that a bending level of the touch screen is equal to or higher than a preset bending level by using the bending sensor.

* * * * *